Figure 1:
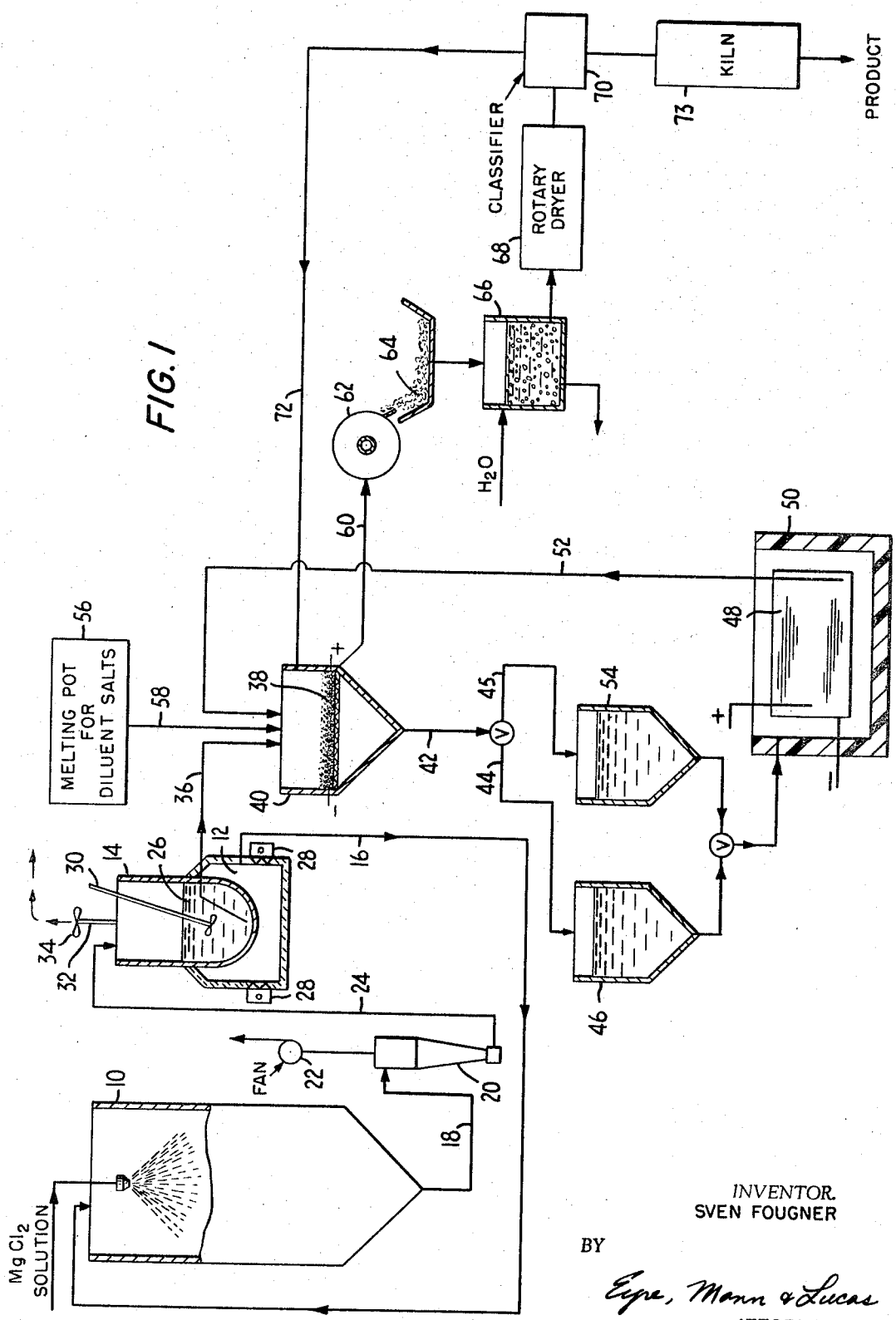

United States Patent Office 3,317,414
Patented May 2, 1967

3,317,414
PRODUCTION OF MAGNESIUM CHLORIDE AND MAGNESIUM METAL
Sven Fougner, Garden City, N.Y., assignor to Magnalith Corporation, a corporation of New York
Filed Mar. 17, 1964, Ser. No. 352,611
16 Claims. (Cl. 204—70)

This invention relates to improvements in the production of magnesium metal and more particularly to new methods of obtaining anhydrous magnesium chloride which is substantially free of magnesium oxide and hence represents an improved raw material for electrolytic production.

In the production of magnesium metal by electrolysis of molten magnesium chloride, it is desirable that the chloride be as completely anhydrous as possible where chlorine is wanted as a co-product. Water in the electrolytic cells decomposes a portion of the magnesium chloride in the cell feed by hydrolysis to magnesium oxide and hydrogen chloride, and also reacts in the vapor phase with chlorine cell gas to form more hydrogen chloride, and thus tends to cause losses in the yield of both magnesium metal and chlorine, the latter having economic value as a by-product of the electrolytic cells. The precipitation of insoluble magnesium oxide leads to further losses when it is removed periodically from the cells, along with entrained magnesium chloride, as a sludge fraction.

Magnesium chloride is extremely hygroscopic, forming several well-defined hydrates with one to twelve moles of water. In conventional production processes, aqueous solutions of magnesium chloride are dehydrated, often in stages, to progressively eliminate the water of crystallization. However, it is not possible to obtain pure anhydrous magnesium chloride solely by application of heat because the lower hydrates decompose partly to magnesium oxide and hydrochloric acid at the elevated temperatures required for vaporizing the strongly bound water of crystallization. For this reason, conventional processes rely on treatments under chlorine, hydrogen chloride or other chlorine-containing gases to suppress formation of magnesium oxide or chemically convert the unwanted magnesium oxide, all of which are costly, wasteful and troublesome techniques particularly when corrosive materials like chlorine or hydrogen chloride are used.

I have now discovered a new method of producing anhydrous magnesium chloride which not only eliminates the above-mentioned difficulties, but also can derive an economic credit from the formation of magnesium oxide to further reduce production costs. More specifically, in a preferred embodiment the method allows for recovery of magnesium oxide in a simple, inexpensive manner and, after minor processing, this magnesium oxide can be sold as a substantially pure, refractory grade product.

Broadly described, my method comprises the steps of mixing magnesium chloride containing not more than about 30% by weight of water with molten anhydrous magnesium chloride, thereby evaporating about 70% to 90% or more of water and causing the remainder of the water to be consumed by hydrolytic reaction with magnesium chloride to form magnesium oxide and hydrochloric acid, then separating the mixture of molten magnesium chloride with suspended magnesium oxide into at least two fractions, one of which comprises molten anhydrous magnesium chloride which is substantially free of magnesium oxide and the other fraction comprises magnesium oxide in mixture with entrained magnesium chloride, and washing said other fraction with molten inorganic salts in which magnesium oxide is substantially insoluble to recover substantially all of the entrained magnesium chloride from the oxide particles. The step of separation into two fractions may be carried out by one or a combination of several alternative techniques such as filtration, decantation or centrifugal flow separation, all of which will be more fully described hereinafter. In preferred embodiments of my process, particles of magnesium oxide are used as a filter medium, molten depleted electrolyte from the electrolytic magnesium cells is used as a wash liquid and fresh molten inorganic salts are used in a final wash to recover additional amounts of entrained magnesium chloride and to provide at the same time the means for correcting any imbalance in the composition of the cell electrolyte.

In carrying out the method broadly described above, I first partially dehydrate aqueous solutions of magnesium chloride containing a relatively high weight concentration of the chloride, at least about 28% and preferably about 36% or more. Such solutions can be economically obtained by the concentration of sea water or other brines such as the deep Michigan brines or water from the Great Salt Lake, all of which are known sources of magnesium chloride. Such natural brines are usually of complex chemical composition, and the concentrates obtained therefrom will contain other salts besides magnesium chloride, for example, chlorides and sulfates of alkali metals and alkaline earth metals, etc. However, since it would be economically prohibitive to eliminate all of these salts in a cell feed derived from such concentrates, and since some of these salts such as the alkali metal and alkaline earth metal chlorides serve useful purposes in cell operation, there is no requirement for the other salts to be removed completely.

Concentration of the raw brine may be carried out in any of the conventional ways, but a particularly inexpensive and simple method is "ponding" or solar evaporation, which I prefer. In this technique, the brine is conducted through a system of shallow basins for exposure to the heat of the sun to evaporate water from the brine and develop after progressive precipitation of other less soluble salts a high weight concentration of magnesium chloride therein. For example, ponding of water from the Great Salt Lake may depending on the weather yield concentrated solutions containing up to about 36% by weight of magnesium chloride, with minor amounts of accompanying salts. After depression or removal of certain impurities such as boron and sulfates, such a solution is well suited as the starting material to be treated in accordance with my method although the method is equally effective with initial aqueous solutions of substantially pure magnesium chloride.

The concentrated magnesium chloride solution is partially dehydrated to the point where its water content does not exceed about 30% by weight, and preferably is much lower. This can be readily accomplished by spray drying, or drying in a fluidized bed or similar techniques. It is desirable to reduce the water content as much as possible in order to minimize the amount of water which has to be completely eliminated in the subsequent step where the degree of effervescence and chilling of a molten mass of anhydrous magnesium chloride and of formation of magnesium oxide will vary directly with the amount of water added. On the other hand, reduction of water content in the partial dehydration step has to be balanced against the tendency for magnesium oxide to form as the lower hydrates of the chloride are reached and higher dehydrating temperatures are used. In general, partial dehydration to a moisture content within the range from about 5% to about 20% by weight is adequate and typically up to about 6% of magnesium oxide may be formed under these conditions. Dehydration of the magnesium chloride to a moisture content not exceeding about 30% by weight will result in solidification of the salt in the form of one of its lower hydrates. Where spray drying or similar techniques are used for accomplishing partial dehydration, preferably the magnesium chloride should be caused to solidify as a coarse powder which is more easily recovered in cyclones, less readily absorbs atmospheric moisture, and is a desirable form for subsequent handling in accordance with my method. However, larger aggregates of the partially dehydrated salt may also be treated with equally good results.

I next add the partially dehydrated magnesium chloride, containing up to about 30% by weight of water, to a molten mass of substantially pure anhydrous magnesium chloride preferably while the molten mass is being agitated. In this step, the water contained in the partially dehydrated magnesium chloride is completely eliminated by two mechanisms, vaporization and hydrolysis. Anywhere from 70% to 90% or more of the total water will be vaporized and expelled from the system as steam, and the remainder will react with magnesium chloride to form magnesium oxide and hydrogen chloride, the latter also being expelled as vapors. The important considerations in this step of my method are the rate of addition of the partially dehydrated magnesium chloride, the water content thereof and the heat reserve of the molten mass of anhydrous magnesium chloride.

Since the water in the partially dehydrated salt is to be eliminated primarily by vaporization, the molten anhydrous magnesium chloride must be capable of supplying the heat required to vaporize the major proportion of the added water and still remain above melting temperature. Pure magnesium chloride melts at about 714° C. and where other inorganic metal chlorides are also present, the melting point may be somewhat lower. Regardless of the actual melting temperature, the molten mass should be heated to a considerably higher temperature to build up the heat reserve which will be absorbed as water leaves the system in the form of steam. In general, the molten mass of anhydrous magnesium chloride should be heated to temperatures of about 850° to about 1,000° C., with the highest practicable temperatures always being desirable because greater variations in the input rate of water into the molten mass can be tolerated.

By regulating the rate of feed of the partially dehydrated salt in balance to the heat furnished to the molten mass, it is possible to add the partially dehydrated salt and eliminate water from the system continuously. Also, I prefer to maintain a slight suction over the molten mass of anhydrous magnesium chloride by means of fans and the like to ensure positive removal of the steam and hydrogen chloride vapors which are expelled from the mass.

I now separate the mixture of completely anhydrous molten magnesium chloride and suspended magnesium oxide into a liquid fraction consisting of molten magnesium chloride which is substantially free of magnesium oxide and a sludge fraction which consists of magnesium oxide in mixture with entrained molten magnesium chloride. This may be done by passing the magnesium chloride-magnesium oxide mixture through a filter medium whereby the liquid fraction noted above is collected as the filtrate and the sludge fraction remains on the filter bed for subsequent treatment. Alternatively, the magnesium chloride-magnesium oxide mixture may be transferred to holding vessels and, after a settling period, the liquid fraction noted above is decanted off and the sludge fraction retained in the vessels for subsequent treatment. Still another separation technique consists of passing the magnesium chloride-magnesium oxide mixture through a centrifugal flow separator such as a hydrocyclone where through centrifugal force the liquid fraction noted above is discharged as the lighter stream and the sludge fraction is discharged below as the heavier stream and collected for subsequent treatment. Whichever liquid-solid separation technique I employ, I prefer to do so at the highest practicable temperature since this will reduce the viscosity of the molten magnesium chloride and thereby facilitate separation.

In carrying out separation by the filtration technique, the conventional sand-type filter made up of two or more layers of particles of the filter medium, with the coarser particles forming the bottom of the bed, is well suited for this operation. Of course, the particles of the filter medium must be capable of withstanding high temperatures since the filter bed has to be heated to prevent chilling and solidification of the molten magnesium chloride. Various refractory materials such as metal oxides, ceramics, fibrous asbestos, quartz and other known materials of high temperature durability can be used to construct the filter bed. The filter is heated to a temperature at least as high as the melting temperature of the magnesium chloride-magnesium oxide mixture to be filtered and preferably the filter is heated to higher temperatures, from about 850° C. to 950° C., to avoid any possibility of freezing of the molten mixture. This heating can be accomplished by conducting combustion gases directly through the filter bed or by external flames indirectly bearing upon the filter bed or by alternating induction currents of selected frequency.

The mixture of molten magnesium chloride and magnesium oxide is preferably percolated through the filter by gravity flow and a large proportion of the magnesium chloride will be recovered as the filtrate. The rest will remain behind due to entrainment with the magnesium oxide particles which are collected in and on the filter bed. The filtrate is transferred to a holding vessel, maintained at or above the melting temperature of magnesium chloride, for delivery to the electrolytic magnesium cells in its recovered form or blended with other cell feed materials.

It is a particularly important feature of my invention that the filter bed is now treated to recover the entrained molten magnesium chloride that is associated with the magnesium oxide particles retained in and on the filter. The amount of the molten magnesium chloride that may be retained in and on the filter in any particular case will vary, and may be more than 50% of the total weight of all materials which are retained by the filter. This represents a significant cost factor loss of which could hardly be tolerated in a commercial process.

Accordingly, in order to recover the entrained molten magnesium chloride, I now wash the filter with molten inorganic salts in which magnesium oxide is substantially insoluble, and preferably use those salts which are normally present in the cell feed electrolyte which is electrolyzed in the magnesium metal cells. By using such inorganic salts, the molten magnesium chloride recovered in the wash liquid can be readily blended with the pure anhydrous magnesium chloride previously obtained as the filtrate for delivery to the electrolytic cells.

The wash liquid can be molten alkali metal or alkaline earth metal salts such as sodium chloride, potassium chloride, calcium chloride, barium chloride or mixtures thereof. Where a mixture of salts is to be used, preferably they are the same salts and used in the same proportions as those salts which make up the electrolyte in any particular case for the electrolytic magnesium cells. In this way, the wash liquid will not constitute a completely foreign or intolerable material in the feed system which supplies electrolyzable material to the magnesium metal cells. The inorganic salts can be obtained from a separate source, melted and heated to temperatures above the melting point of the magnesium chloride on the filter for use as a wash liquid.

The wash liquid will replace a substantial proportion of the entrained magnesium chloride in and on the filter and the enriched wash liquid which is recovered from the filter again may be transferred to a holding tank for delivery to the electrolytic magnesium cells alone or blended with the pure anhydrous magnesium chloride previously obtained from the filter.

In a particularly advantageous embodiment of my method, molten depleted electrolyte from the electrolytic magnesium cells is recycled to the filter for use as the wash liquid. In conventional practice, the electrolyte in the magnesium cells is considered depleted when the magnesium chloride concentration therein decreases to between 6% to 12% by weight. At that time, a given depleted electrolyte may contain from 65 to 75% of sodium chloride and from 15 to 20% of calcium chloride plus smaller amounts of other salts such as potassium chloride. This depleted electrolyte is an excellent wash liquid since it introduces no undesired materials into the electrolytic cells when it is enriched and returned to the cells, and thus the efficiency of my method is considerably improved where the depleted electrolyte is used to wash the filter bed. As previously mentioned, the final wash is preferably carried out with a mixture of fresh molten inorganic salts which may be formulated in any desired relative proportions that will be useful for adjusting the composition of the cell electrolyte by effecting an increase or decrease in the relative proportion of any one or more salts therein. In particular, the use of a final wash liquid as just described can readily compensate for the build up of any one or more diluent salts which are unavoidably introduced as minor constituents of the cell feed.

Following the washing step, the filter bed will contain magnesium oxide particles mixed with entrained salts of the wash liquid. In order to recover all of this magnesium oxide in a simple and inexpensive manner and thereby gain an economic credit from a valuable byproduct, in another preferred embodiment of my method I use magnesium oxide particles themselves as the filtering medium. This eliminates a separation step otherwise required to recover the magnesium oxide and hence considerably reduces the cost of processing and increases the value of the recovered magnesium oxide as a by-product. In using the magnesium oxide particles as the filter bed, I prefer to employ deadburned or roasted magnesium oxide which has been heated in a kiln at temperatures from about 1,500° C. to about 1,800° C. to develop physical and chemical inertness. This helps insure that the magnesium oxide particles as a filter will not cause undesirable changes in the composition of the molten magnesium chloride from which the filter is to separate suspended magnesium oxide. The magnesium oxide particles are used in a graded particle size to construct the filter bed in a manner similar to the conventional sand-type filter where the coarser particles make up the bottom layer of the bed and the finer particles the upper layer.

Where the magnesium oxide particles are used as the filter and the capacity of the filter becomes exhausted, the filter is first cooled to solidify all of the molten salts of the wash liquid which have become trapped or entrained therein. Cooling may be carried out either on a drum roller to recover solidified flakes of the magnesium oxide particles with the associated salts of the wash liquid or in a mold to recover a casting which is then preferably broken up into smaller pieces. The solidified filter material is then leached with cold water to dissolve and remove the entrained water soluble salts of the wash liquid.

Following removal of the water soluble salts of the wash liquid, the remaining magnesium oxide is dried for example in a rotary drier. The dried product is preferably classified, with the coarser particles being recycled to replenish the filter bed, and the remaining magnesium oxide may if desired be roasted in a kiln at temperatures from about 1,500° C. to about 1,800° C., to recover a substantially pure refractory grade of the oxide as a by-product.

In using the decantation technique for separating the magnesium chloride-magnesium oxide mixture into liquid and solid fractions, the mixture is held in heated vessels to permit the magnesium oxide particles to settle as a lower layer. Depending on the depth of the hold tanks and the rate of settling, the holding period may vary from one hour up to about ten hours. Then, the supernatant molten magnesium chloride is decanted off as the liquid fraction and the remaining magnesium oxide sludge fraction is washed with molten inorganic salts, preferably depleted cell electrolyte, in a manner similar to treatment previously described for the filter bed. Again, valuable magnesium oxide by-product can be readily obtained from the decantation technique.

In a centrifugal flow separation technique which I prefer to use, the magnesium chloride-magnesium oxide mixture is fed tangentially and at high velocity into a cylindrical vessel having a cone-shaped bottom and known commercially as a hydrocyclone. Due to the internal construction of the vessel and the high feed velocity, a classifying action is established wherein the mixture swirls around the inner wall of the vessel, develops a central vortex and separates gradually into a light fraction which consists of magnesium chloride and is removed as overflow and a heavier sludge fraction which consists of magnesium oxide with entrained magnesium chloride which is discharged as the underflow. The heavy sludge fraction is collected and washed with molten inorganic salts, as before, to recover the entrained magnesium chloride as well as magnesium oxide by-product.

Figure 2:
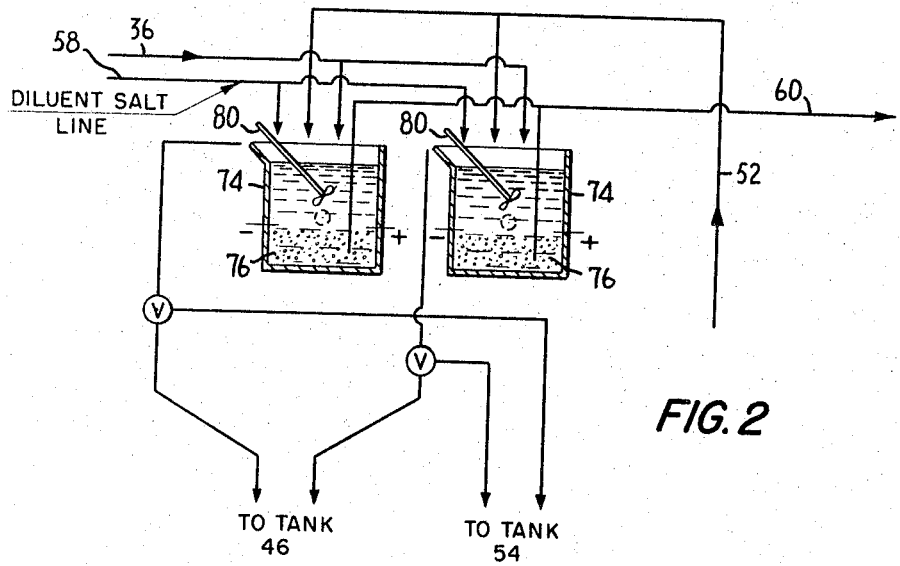
Figure 3:
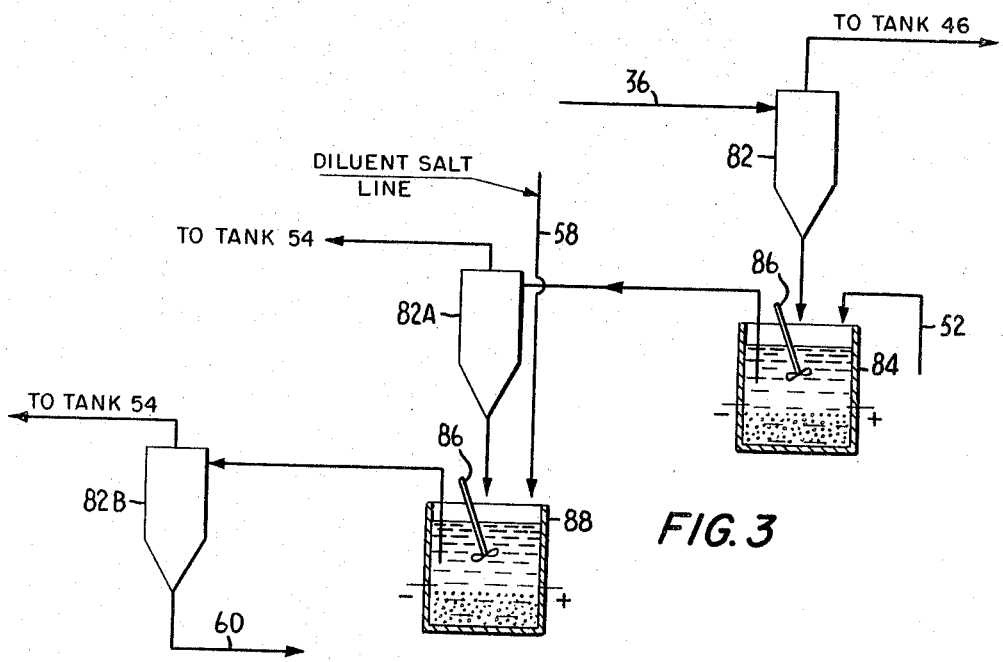

Further details of my invention will be readily understood by reference to the accompanying drawing of which:

FIG. 1 illustrates one form of process for producing anhydrous electrolyzable magnesium chloride in accordance with the invention wherein filtration is employed as the separation technique, FIG. 2 illustrates the use of decantation as an alternative separation technique, and FIG. 3 illustrates the use of centrifugal flow separation as an alternative separation technique.

As shown in FIG. 1, an aqueous solution of magnesium chloride containing by weight concentration about 36% magnesium chloride with minor amounts of alkali metal chlorides and obtained by concentration of a brine is partially dehydrated in spray dryer 10 by means of hot combustion gases which are withdrawn from the heating chamber 12 of reactor 14 and recycled to dryer 10 through the insulated line 16. The spray dryer is operated under such conditions as to reduce the moisture content of the magnesium chloride, for example, to 18% by weight. The partially dehydrated solidified magnesium chloride particles are transferred through line 18 to a conventional dry cyclone 20 where gases and dust are vented by fan 22. The partially dehydrated magnesium chloride particles are next introduced into reactor 14 through line 24.

The reactor 14 contains a molten mass of anhydrous magnesium chloride 26 and is equipped with fire boxes 28, heating chamber 12, stirrer 30, overhead line 32 and fan 34. The fire boxes 28 jet high temperature flames and combustion gases into chamber 12 for transfer of heat to reactor 14 to maintain the magnesium chloride therein at a temperature of 950° C.

From 70% to 90% of the water that is introduced into the molten magnesium chloride 26 is vaporized and is withdrawn through the overhead line 32 with the aid of fan 34. The remaining portion of the water reacts with the magnesium chloride 26 to form insoluble magnesium oxide and hydrogen chloride, the latter also passing out through overhead line 32 as vapor.

The mixture of molten magnesium chloride and suspended magnesium oxide is now transferred through the insulated line 36 to filter bed 38 contained in the vessel 40. The filter bed 38 is made of deadburned magnesium oxide particles in several particle sizes graded in position so that the coarser particles are at the bottom and the finer ones at the top. In steady state operation, the filter bed 38 is heated as indicated by means of alternating inducted electric currents well above the melting temperature of the molten magnesium chloride entering through line 36, say 900° C. This molten magnesium chloride is completely anhydrous but does contain a minor quantity of magnesium oxide, about 14% by weight. Of this, about 3% is formed in the spray drying and the remainder (11%) by hydrolysis in the reactor 14.

The portion of the molten magnesium chloride which percolates through filter bed 38 is collected as the filtrate and transported through insulated lines 42 and 44 to the holding tank 46 which is maintained above the melting temperature of magnesium chloride.

As the quantity of magnesium oxide collected in the filter bed 38 increases and the filtration capacity diminishes, the flow through line 36 is interrupted and molten depleted electrolyte 48 is withdrawn from the electroytic magnesium cell 50 and transported to the filter bed 38 through insulated line 52.

As the molten depleted electrolyte passes through filter bed 38, it washes out the entrained molten magnesium chloride associated with the insoluble magnesium oxide particles. The wash liquid enriched with such recovered magnesium chloride is transported through lines 42 and 45 to a hold tank 54 maintained above the melting temperature of the enriched wash liquid. If desired, the filter bed 38 can now be given a final wash with fresh molten salts which are mixed together and melted in pot 56 and delivered to the filter bed 38 through insulated line 58. These salts are compounded in the desired proportions to serve as make up in the cell 50 if the concentration of diluent salts therein becomes imbalanced through introduction of impurities with the cell feed.

Now, the filter bed 38, consisting of the original magnesium oxide particles thereof along with the filtered magnesium oxide and the entrained wash liquid, is conveyed through open chute 60 to the drum dryer 62 where it is cooled in the form of flakes 64. At this point, the magnesium oxide particles will be intermixed with solidified salts of the depleted electrolyte 48 or of the final wash liquid derived from pot 56, as the case may be. The flakes 64 are therefore transferred to the leach tank 66 where they are leached with water to dissolve and remove the water soluble salts of the wash liquid.

Following removal of the water soluble components, the remaining particles of magnesium oxide are transferred to the rotary dryer 68 where they are dried and then to a screen type classifier 70 from which a portion of the dried magnesium oxide is returned through line 72 to the vessel 40 in order to replenish the filter bed 38. The remainder is roasted at 1,700° C., for example, in the kiln 73 and recovered as a commercially valuable product which contributes an economic gain to the process. The molten anhydrous magnesium chloride stored in tank 46 and the molten depleted electrolyte in tank 54, now enriched with additional magnesium chloride, may be blended with each other in any desired proportions and fed to the electrolytic cell 50 or they may be delivered separately to the electrolytic cell 50 as may be required.

FIG. 2 illustrates the use of decantation as the means for separating into liquid and solid fractions the magnesium chloride-magnesium oxide mixture formed in reactor 14. As there shown, the magnesium chloride-magnesium oxide mixture is placed into a plurality of electrically heated hold tanks 74, two tanks being illustrated specifically. The mixture is permitted to stand so that the magnesium oxide particles 76 may settle to the bottom after which the supernatant molten magnesium chloride is drawn off by decantation or siphoning and transported through insulated lines to hold tank 46. Then, molten depleted electrolyte 48 is added via line 52 to the magnesium oxide sludge fraction in the hold tanks 74 and the mixture agitated by means of stirrers 80 to wash the oxide particles. After a second settling period, the wash liquid now enriched with magnesium chloride is decanted off and transported to tank 54 and this sequence of washing, settling and decanting can be repeated further as desired. As with the filtration technique, the last wash may be carried out with fresh molten salts corresponding to those required to maintain the composition of the cell electrolyte and thereafter the washed magnesium oxide particles are removed from the tanks 74 and treated in the manner described for FIG. 1 to recover a valuable by-product. Here, however, all of the magnesium oxide can be recovered without recycling any portion since a filter bed does not have to be replenished as in FIG. 1.

FIG. 3 illustrates another alternative wherein hydrocyclones are used for separation of the magnesium chloride-magnesium oxide mixture formed in reactor 14. Hydrocyclones are commercial devices which are available in the United States. They are a form of centrifugal cyclone apparatus which have no inner moving parts but rely instead on internal structural configuration, high input velocities in a tangential feed and centrifugal force to fractionate liquids into light and heavy fractions. As shown in FIG. 3, I introduce the magnesium chloride-magnesium oxide into the hydrocyclone 82 and thereby separate a light fraction consisting substantially of pure molten magnesium chloride which is discharged as overflow and transported to tank 46. The heavier magnesium oxide sludge fraction is discharged from the apex of hydrocyclone 82 into a vessel 84 where it is washed with molten depleted electrolyte 48 under agitation (stirrer 86). The mixture is then transported to a second hydrocyclone 82A from which the depleted electrolyte 48 now enriched with magnesium chloride is removed as overflow and transported to tank 54. The washed magnesium oxide, with entrained wash liquid, is discharged into vessel 88 where it may be again washed with molten depleted electrolyte 48 or with fresh molten salts (supplied through line 58) as a final wash. Ultimately, the mixture is passed through hydrocyclone 82B for the last time, the overflow liquid fraction being transported to tank 54 and the heavier magnesium oxide sludge fraction being conveyed through line 60 to the drum roller 62 for final treatment as described for FIG. 1. Again, all of the magnesium oxide is recovered as a by-product. It will be understood, of course, that the hydrocyclones 82, 82A and 82B can be heated, if required, to prevent solidification of the molten salts that are being passed therethrough. Also, the sequence of centrifugal flow separation with subsequent washing of the underflow fraction may be repeated as many times as are desired.

While the drawing illustrates only one electrolytic magnesium cell for purposes of simplicity, in actual commercial practice many banks of these cells will be used in conventional manner.

It will be understood that it is intended to cover all changes and modifications of the preferred embodiments of the invention herein chosen for purpose of illustration which do not depart from the spirit and scope of the invention.

I claim:

1. In the manufacture of magnesium chloride and electrolysis thereof to produce magnesium metal, the improvement which comprises adding to a molten mass of anhydrous magnesium chloride partially-dehydrated magnesium chloride which contains water in an amount not exceeding about 30% by weight, maintaining said molten mass at a temperature sufficient to cause a portion of said water to vaporize and the remaining portion to react with magnesium chloride to form magnesium oxide, separating the resulting mixture of molten anhydrous magnesium chloride and magnesium oxide into one fraction comprising molten anhydrous magnesium chloride which is substantially free of magnesium oxide and another fraction comprising solid magnesium oxide intermixed with entrained molten magnesium chloride, and washing said magnesium oxide fraction with at least one molten inorganic salt in which magnesium oxide is substantially insoluble to recover entrained molten magnesium chloride, said molten inorganic salt being selected from the group consisting of alkali metal halides and alkaline earth metal halides.

2. The improvement as in claim 1 wherein said partially-dehydrated magnesium chloride contains from about 5% to about 20% by weight of water.

3. The improvement as in claim 1 wherein said partially-dehydrated magnesium chloride is in mixture with minor amounts of alkali metal chlorides.

4. The improvement as in claim 1 wherein said molten mass of anhydrous magnesium chloride is maintained at a temperature from about 850° C. to about 1,000° C.

5. The improvement as in claim 1 wherein said magnesium oxide fraction is washed with a wash liquid selected from the group consisting of molten sodium, potassium, calcium and barium chlorides and mixtures thereof.

6. In the manufacture of magnesium chloride and electrolysis thereof to produce magnesium metal, the improvement which comprises adding to a molten mass of anhydrous magnesium chloride partially-dehydrated magnesium chloride which contains water in an amount not exceeding about 30% by weight, maintaining said molten mass at a temperature from about 850° C. to about 1,000° C. to cause a portion of said water to vaporize and the remaining portion to react with magnesium chloride to form particulate magnesium oxide, passing the resulting mixture of molten anhydrous magnesium chloride and particulate magnesium oxide through a filter bed of particulate solid materials heated to a temperature above the melting point of magnesium chloride, retaining said particulate magnesium oxide along with entrained molten magnesium chloride on said filter bed and collecting the balance of said molten magnesium chloride as the filtrate, withdrawing molten depleted electrolyte containing from about 6% to about 12% by weight of magnesium chloride from an electrolytic magnesium cell, and washing said filter bed and retained magnesium oxide with said depleted electrolyte to recover entrained molten magnesium chloride.

7. The improvement as in claim 6 which includes the additional steps of cooling said filter bed to solidify all molten depleted electrolyte therein, leaching said cooled filter bed with water to remove water soluble materials, and then separating said particulate magnesium oxide from said filter bed solid materials.

8. The improvement as in claim 6 wherein said filter bed solid materials comprise magnesium oxide particles and which includes the additional steps of cooling said filter bed to solidify all molten depleted electrolyte therein, leaching said cooled filter bed with water to remove water soluble materials and then drying the resulting mixture of said particulate magnesium oxide and said filter bed magnesium oxide particles.

9. The improvement as in claim 8 which includes the additional step of returning a portion of said dried mixture of particulate magnesium oxide and filter bed magnesium oxide particles to said filter bed to replenish the latter.

10. In the manufacture of magnesium chloride and electrolysis thereof to produce magnesium metal, the improvement which comprises adding to a molten mass of anhydrous magnesium chloride partially-dehydrated magnesium chloride which contains water in an amount not exceeding about 30% by weight, maintaining said molten mass at a temperature from about 850° C. to about 1,000° C. to cause a portion of said water to vaporize and the remaining portion to react with magnesium oxide, holding the resulting mixture of molten anhydrous magnesium chloride and particulate magnesium oxide substantially undisturbed to permit said magnesium oxide to settle as a lower layer, thereafter decanting molten anhydrous magnesium chloride which is substantially free of magnesium oxide and thereby separating the same from said lower layer which comprises said particulate magnesium oxide along with entrained molten magnesium chloride, withdrawing molten depleted electrolyte containing from about 6% to about 12% by weight of magnesium chloride from an electrolytic magnesium cell, and washing said lower layer with said depleted electrolyte to recover entrained molten magnesium chloride.

11. The improvement as in claim 10 wherein said washing is accomplished by agitating said molten depleted electrolyte together with said lower layer of particulate magnesium oxide and entrained molten magnesium chloride, then holding the resulting mixture substantially undisturbed to permit said magnesium oxide to settle again as a lower layer, and thereafter decanting said molten depleted electrolyte, now enriched with entrained molten magnesium chloride, and thereby separating the same from said second lower layer.

12. The improvement as in claim 10 wherein said partially-dehydrated magnesium chloride contains from 5% to about 20% by weight of water.

13. The improvement as in claim 11 which includes the added step of washing said second lower layer with a wash liquid selected from the group consisting of molten sodium, potassium, calcium and barium chlorides and mixtures thereof.

14. In the manufacture of magnesium chloride and electrolysis thereof to produce magnesium metal, the improvement which comprises adding to a molten mass of magnesium chloride partially-dehydrated magnesium chloride which contains water in an amount not exceeding about 30% by weight, maintaining said molten mass at a temperature from about 850° C. to about 1,000° C. to cause a portion of said water to vaporize and the remaining portion to react with magnesium chloride to form particulate magnesium oxide, swirling the resulting mixture of molten anhydrous magnesium chloride and particulate magnesium oxide centrifugally at high velocity to separate said mixture into a light fraction comprising molten anhydrous magnesium chloride which is substantially free of magnesium oxide and a heavier fraction comprising particulate magnesium oxide intermixed with entrained molten magnesium chloride, with drawing molten depleted electrolyte containing from about 6% to about 12% by weight of magnesium chloride from an electrolytic magnesium cell, and washing said heavier fraction with said depleted electrolyte to recover entrained molten magnesium chloride.

15. The improvement as in claim 14 which includes the added steps of agitating said molten depleted electrolyte together with said heavier fraction of particulate magnesium oxide and entrained molten magnesium chloride, then swirling the resulting mixture centrifugally at high velocity to separate the same into light fraction comprising molten depleted electrolyte enriched with magnesium chloride and a heavier fraction comprising particulate magnesium oxide intermixed with entrained molten depleted electrolyte.

16. The improvement as in claim 15 which includes the added step of washing said heavier fraction of particulate magnesium oxide and entrained molten depleted electrolyte with a wash liquid selected from the group consisting of molten sodium potassium, calcium and barium chlorides, and mixtures thereof.

(References on following page)

References Cited by the Examiner

UNITED STATES PATENTS

| | | | |
|---|---|---|---|
| 1,957,284 | 5/1934 | Obiedoff | 204—70 |
| 1,967,550 | 7/1934 | Comecasse | 204—70 |
| 2,974,093 | 3/1961 | Bauer et al. | 204—70 |

FOREIGN PATENTS

| | | |
|---|---|---|
| 118,715 | 7/1944 | Australia. |
| 120,343 | 9/1945 | Australia. |

JOHN H. MACK, *Primary Examiner.*

G. KAPLAN, *Assistant Examiner.*